US007309056B2

(12) United States Patent
Harris et al.

(10) Patent No.: US 7,309,056 B2
(45) Date of Patent: Dec. 18, 2007

(54) DUAL PEDESTAL SHUT-OFF VALVE

(75) Inventors: James M. Harris, Menlo Park, CA (US); Michael Selser, Livermoe, CA (US); Bradford A. Cozad, Newark, CA (US); Albert K. Henning, Palo Alto, CA (US)

(73) Assignee: SMC Kabushiki Kaisha, Tokyo (JP)

( * ) Notice: Subject to any disclaimer, the term of this patent is extended or adjusted under 35 U.S.C. 154(b) by 257 days.

(21) Appl. No.: 10/810,242

(22) Filed: Mar. 26, 2004

(65) Prior Publication Data

US 2005/0211301 A1 Sep. 29, 2005

(51) Int. Cl.
*F16K 31/02* (2006.01)
(52) U.S. Cl. .................................... 251/11; 251/129.06
(58) Field of Classification Search .................. 251/11, 251/129.01, 129.06; 137/487.5
See application file for complete search history.

(56) References Cited

U.S. PATENT DOCUMENTS

| | | | | |
|---|---|---|---|---|
| 4,821,997 | A | | 4/1989 | Zdeblick |
| 4,824,073 | A | | 4/1989 | Zdeblick |
| 4,943,032 | A | | 7/1990 | Zdeblick |
| 4,966,646 | A | | 10/1990 | Zdeblick |
| 5,040,567 | A | * | 8/1991 | Nestler et al. ......... 137/625.44 |
| 5,323,999 | A | * | 6/1994 | Bonne et al. ................. 251/11 |
| 5,344,117 | A | * | 9/1994 | Trah et al. ..................... 251/11 |
| 5,417,235 | A | * | 5/1995 | Wise et al. ..................... 137/1 |
| 5,619,177 | A | * | 4/1997 | Johnson et al. ......... 251/129.01 |
| 5,681,024 | A | * | 10/1997 | Lisec et al. .................... 251/11 |
| 5,865,417 | A | | 2/1999 | Harris et al. |
| 5,899,218 | A | * | 5/1999 | Dugan ........................... 137/1 |
| 6,032,689 | A | * | 3/2000 | Tsai et al. .................... 137/486 |
| 6,116,863 | A | * | 9/2000 | Ahn et al. .................. 417/322 |
| 6,149,123 | A | | 11/2000 | Harris et al. |
| 6,160,243 | A | | 12/2000 | Cozad |
| 6,229,683 | B1 | * | 5/2001 | Goodwin-Johansson .... 361/233 |
| 2004/0036047 | A1 | * | 2/2004 | Richter .................. 251/129.06 |

* cited by examiner

*Primary Examiner*—Eric Keasel
*Assistant Examiner*—Cloud Lee
(74) *Attorney, Agent, or Firm*—Fernandez & Associates, LLP

(57) ABSTRACT

Integrated micro-valve is formed to control fluid flow and pressure. The valve converts supplied energy to mechanical energy through a means for energy conversion resident above a flexible wall or membrane. In one embodiment a sealed cavity contains a fluid that expands and contracts as it is heated or cooled, thus causing the flexible wall to move. Movement of this wall or membrane is used to move a valve element and dynamically control the opening or closing of a valve port over a predetermined range. Additional means for stiffening are added to the membrane to improve performance.

11 Claims, 6 Drawing Sheets

DUAL PEDESTAL SHUT-OFF VALVE

FIELD OF THE INVENTION

The invention pertains to the field of integrated, electrically operable micro-valves and, more particularly, to the field of low leak rate integrated micro-valves for industrial, corrosive and ultra-clean applications.

BACKGROUND OF THE INVENTION

Micromachined integrated valves are known in the prior art. Examples of various embodiments of such normally open valves are given in U.S. Pat. Nos. 4,821,997 and 4,824,073 and 4,943,032 and 4,966,646; the disclosures of which are hereby incorporated by reference herein in their entirety.

U.S. Pat. Nos. 5,865,417 and 6,149,123 taught how to make a normally closed, micro-machined valve with a leak rate on the order of $1\times10^{-9}$ scc-atm/sec or less of helium. U.S. Pat. No. 6,160,243 disclosed alternative methods of actuating micro-valves. U.S. Pat. Nos. 5,865,417 and 6,149,123 and 6,160,243 are included by reference herein in their entirety.

An integrated micro-valve, also commonly referred to as a microminiature valve, uses a thin flexible membrane with an actuator to move a valve element. In some embodiments, the flexible membrane is coupled to a cantilever element through a solid extension located on the membrane, as described in the referenced patents and shown in FIGS. 1 and 2, slightly modified from as presented in U.S. Pat. No. 6,149,123. Movement of the membrane 200 causes a cantilever element 300 to move and either open or close off valve seat 410. Port 400 is fluidically coupled to passageways serving as input 520 and output 510 channels. Element 210, typically referred to as a pedestal, is joined to cantilever 300 by an appropriate adhesive or other bonding technique. In FIG. 2 the membrane 200 is actuated and the cantilever 300 is now open. Element 415 is a compliant seat material meant to facilitate sealing against valve seat 410; typically this material is a Teflon-like material, either PTFE or derivatives thereof.

As previously disclosed, membrane 200 is typically 40 to 60 microns thick and of single crystal silicon. The burst strength of the membrane is quite sensitive to design considerations such as overall area and membrane thickness. Processing conditions such as etchants and etching conditions and other variables are also factors in membrane strength. As the inlet pressure in channel 520 increases the force required to open cantilever 300 increases; in addition, as the area of channel 400 increases the opening force also increases. Depending upon the actuation mechanism employed in region 130 of FIG. 1 membrane 200 may not expand outward uniformly; the membrane may expand in such a fashion that the cantilever remains unopened or insufficiently open to meet the design criteria.

The previously disclosed valves were not able to operate reliably above an, inlet pressure of 50 psig, pounds per square inch gauge, while delivering more than 10 slm, standard liters per minute, at an acceptable pressure drop. There is a need for a valve which can flow up to 20 slm at an inlet pressure of over 100 psig with an acceptable pressure drop.

SUMMARY OF INVENTION

In the present invention, the valve is configured as a normally closed valve with at least two pedestals, one in the position as described in U.S. Pat. No. 5,865,417 and one approximately 1 mm from the original pedestal toward the far cavity wall, as shown in FIG. 3. The advantages of the current invention over the previous embodiment are several. First, the membrane is stiffened and no longer can assume actuated positions which do not open the cantilever. Second, more force can now be transferred from the actuation mechanism to open the cantilever; this result further allows the line pressure to be increased to over 100 psig and the inlet ports expanded to at least 1 mm in diameter. Third, by stiffening the membrane and preventing alternate flexure modes of the membrane, greater latitude in placement of the first pedestal is gained. This latitude allows the pedestal, acting as the pivot point on the cantilever, to be moved further from the inlet port, thus moving the cantilever further from the inlet port and decreasing the cantilever acting as a restriction in the flow path.

In some embodiments of the present invention sensing devices are integrated with the valves. In some embodiments these sensing devices are pressure sensors, while in other embodiments these sensing devices are temperature sensors or both. Thus where valves in accordance with embodiments of the present invention have integrated sensing devices to provide dynamic feedback to the energy input source of the energy conversion block, these valves can provide feedback signals to facilitate the control of fluid flow or pressure.

BRIEF DESCRIPTION OF THE DRAWINGS

The present invention may be better understood, and its numerous objects, features and advantages made apparent to those skilled in the art, by referencing the accompanying drawings. For ease of understanding and simplicity, common numbering of elements within the illustrations is employed where an element is essentially the same between illustrations.

DETAILED DESCRIPTION

Embodiments of the present invention will be described with reference to the aforementioned figures. These drawings are simplified for ease of understanding and description of embodiments of the present invention only. Various modifications or adaptations of the specific methods and or structures that represent embodiments of the present invention may become apparent to those skilled in the art as these embodiments are described. All such modifications, adaptations or variations that rely upon the teachings of the present invention, and through which these teachings have advanced the art, are considered to be within the spirit and scope of the present invention. For example, in some embodiments of the present invention, a valve with a single valve port is employed whereas in other embodiments multiple valve ports can be employed. Details of processes that may be used to fabricate portions of embodiments of integrated valve structures is generally known to those of ordinary skill in the art. In addition, the patents referenced, all of which have been previously incorporated by reference herein, provide processing descriptions. Thus, only some processing details, believed not readily apparent are described herein.

Figure 1:
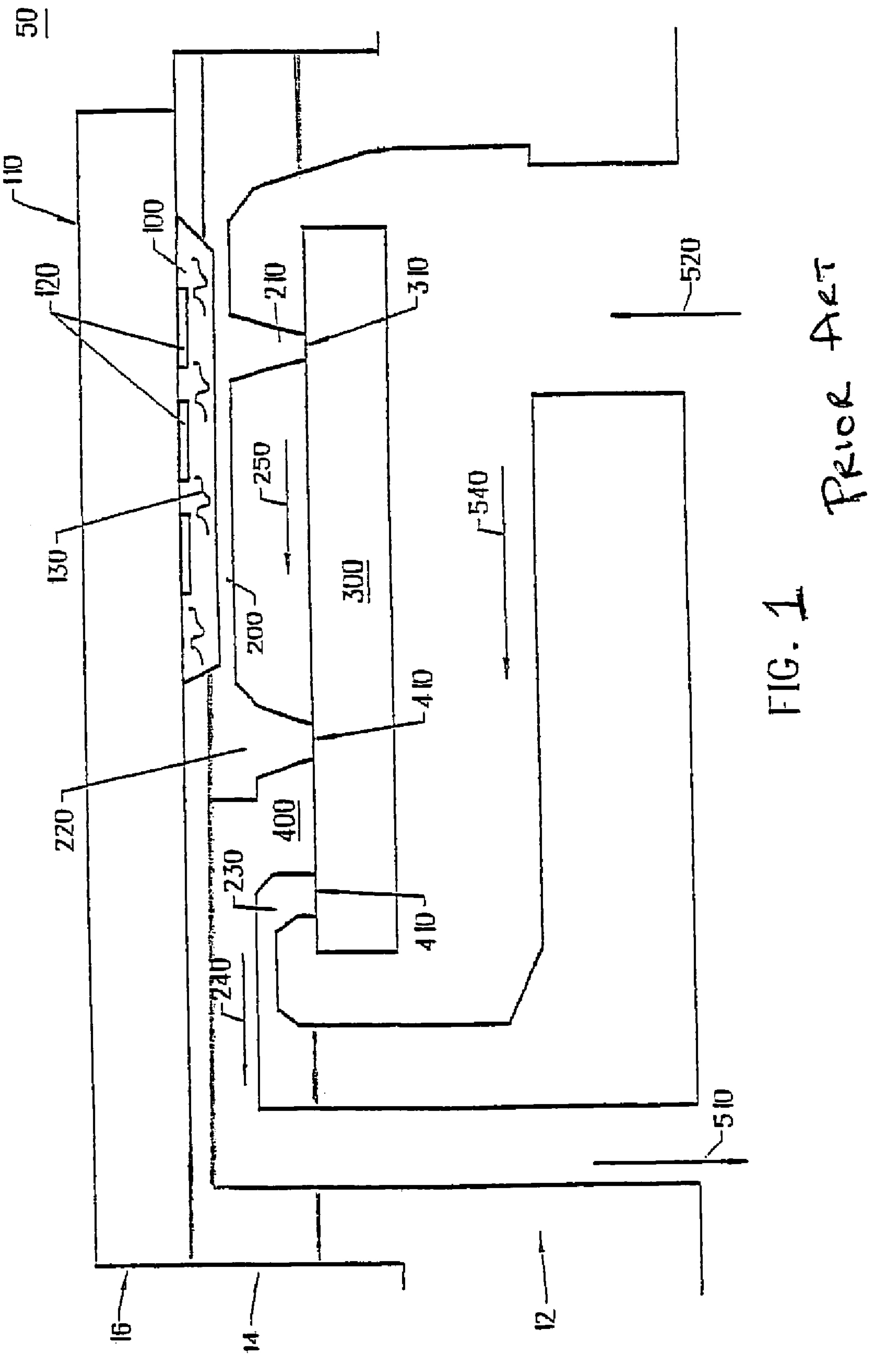
FIG. 1, slightly modified from as presented in U.S. Pat. No. 6,149,123, is the prior art.
Figure 2:
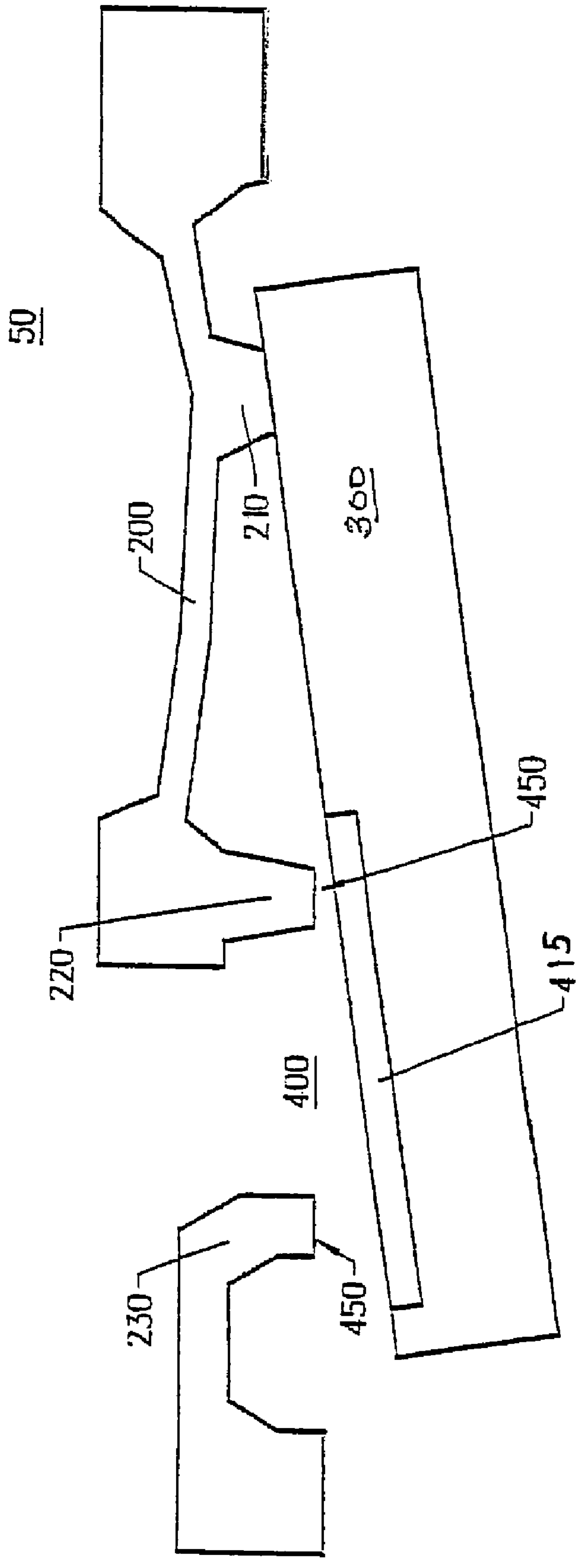
FIG. 2 PRIOR ART
FIG. 2, slightly modified from as presented in U.S. Pat. No. 6,149,123, is the prior art in the actuated or open position.
Figure 3A:
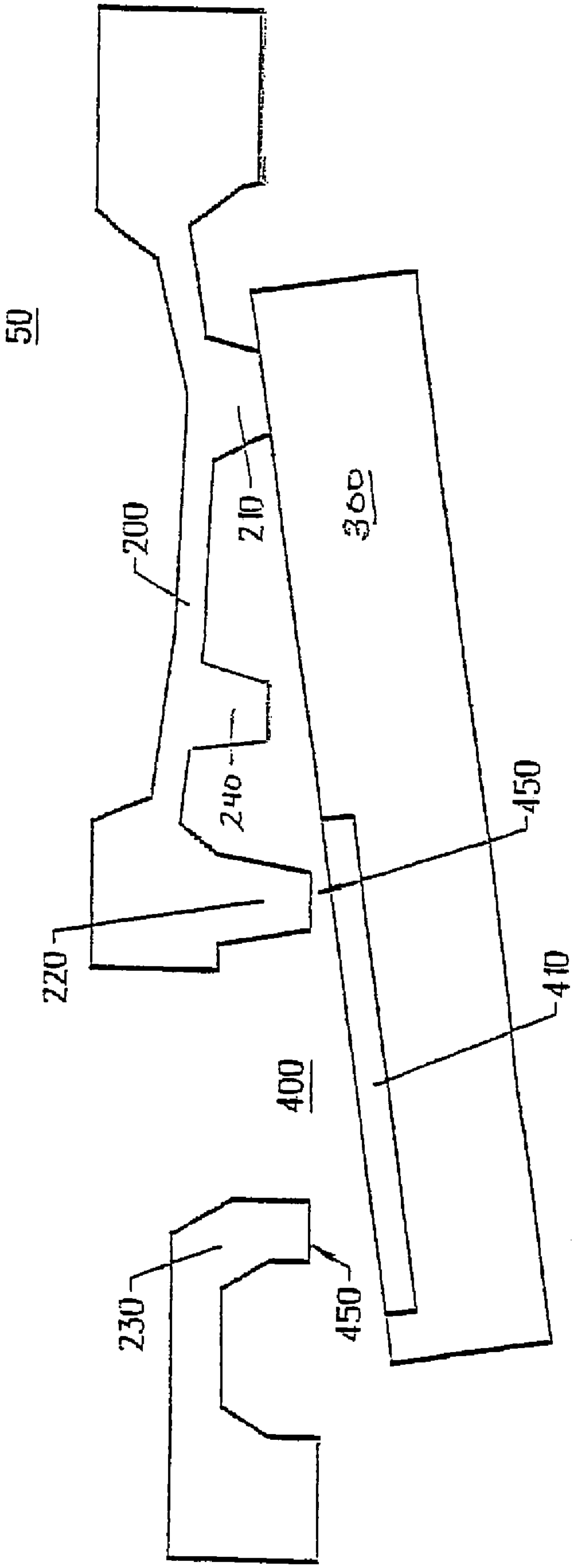
FIGS. 3A and 3B are alternative embodiments of the current invention as improved from the prior art.
Figure 5:
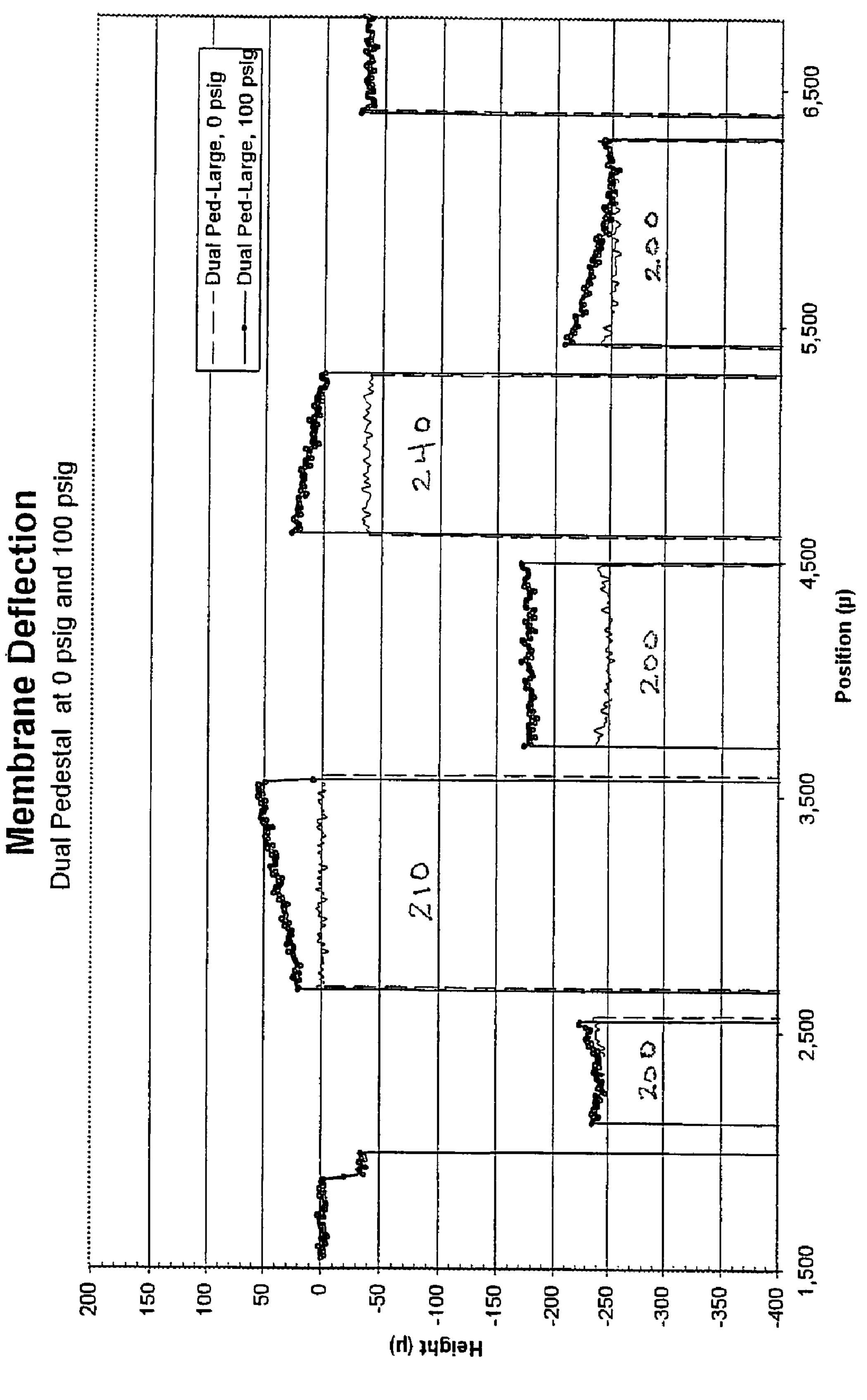
FIG. 5 shows two laser profilometer scans of a dual pedestal valve unactuated and actuated with 100 psig air.

Referring to FIG. 3A, a simplified cross-sectional representation of a portion of an integrated, normally closed, electrically operable, valve 50 fabricated in accordance with an embodiment of the present invention is shown. Referring to FIG. 1, when energy is supplied to actuation means in cavity 100 it causes membrane 200 to flex or deflect outward as drawn schematically in FIG. 3. In addition to forming a wall of cavity 100, flexible membrane 200 is also positioned adjacent to cantilever element 300. Membrane 200 is mechanically coupled to cantilever element 300 through pedestal 210 at coupling point 310. This coupling of flexible membrane 200 to cantilever element 300 advantageously provides for transfer of the movement of membrane 200 to cantilever element 300. In the current invention, in one embodiment, additional pedestal, 240, is added to membrane 200 as shown in FIG. 3. Placement of this second pedestal relative to first pedestal is shown in FIG. 5, being about 1 mm in the direction of the inlet port. As can be seen from the scale of FIG. 5, in this embodiment, second pedestal, 240, is somewhat smaller than first pedestal, 210. The dimensions and location of a second pedestal are not critical. What is critical is that the second pedestal be of sufficient height such that upon actuation second pedestal encounters cantilever element 300 early in the actuation cycle and lifts it slightly to start flow through valve port 400.

The other function performed by second pedestal 240 is a stiffening of membrane 200 such that it may not flex upward while pedestal 210 stays relatively motionless during the actuation cycle. This situation is known to occur when forces greater than 50 psig are placed on cantilever element 300 over the area of valve seat 410 in the direction of port 400. This condition can be catastrophic when the burst strength of membrane 200 is less than the force required to open the valve and less than the actuation pressure applied internally.

One alternative means to achieve a stiffening of membrane 200 is to form ribs of thicker cross section on the membrane in a direction parallel to first pedestal. These ribs are on the order of 20 to 80 microns wide and have thickness, including the membrane, of approximately 50 to 125 microns. Alternatively, other shapes may be used, such as small squares or circles or polygons; as the fraction of the membrane covered by these areas of increased thickness increases, so will the overall stiffness, and the actuation amount versus actuation pressure will decline.

Figure 3B:
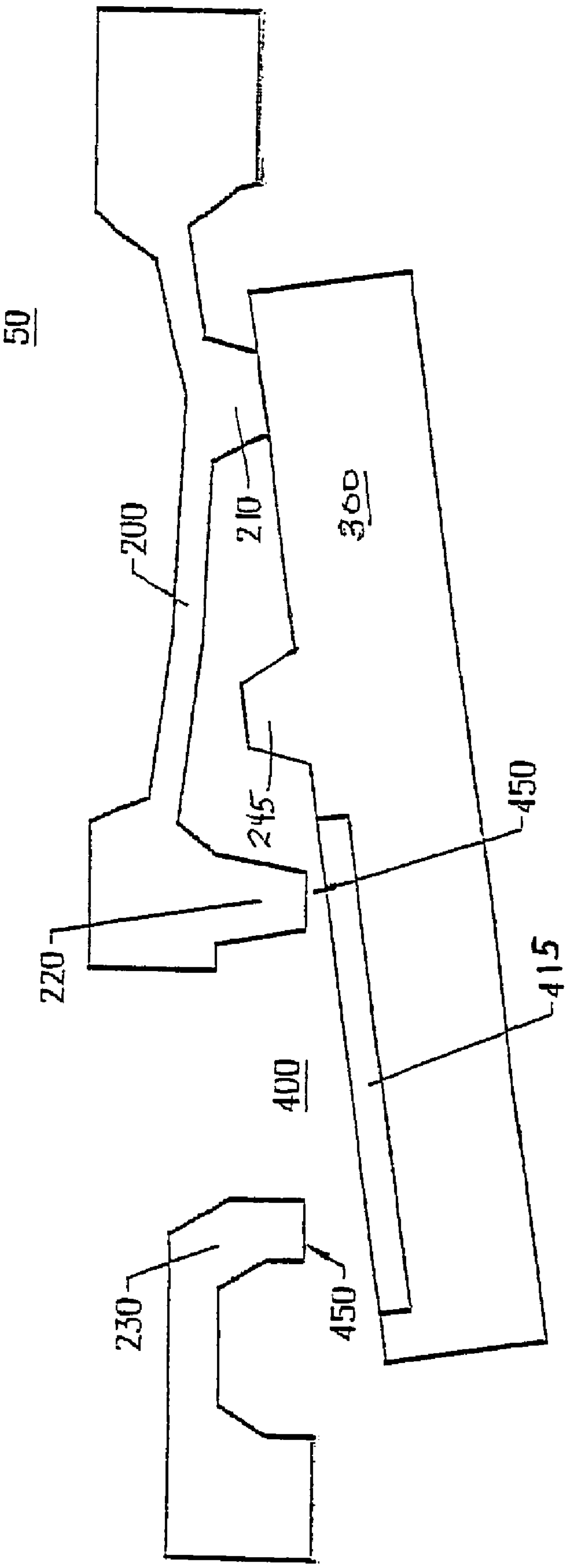
Figure 4:
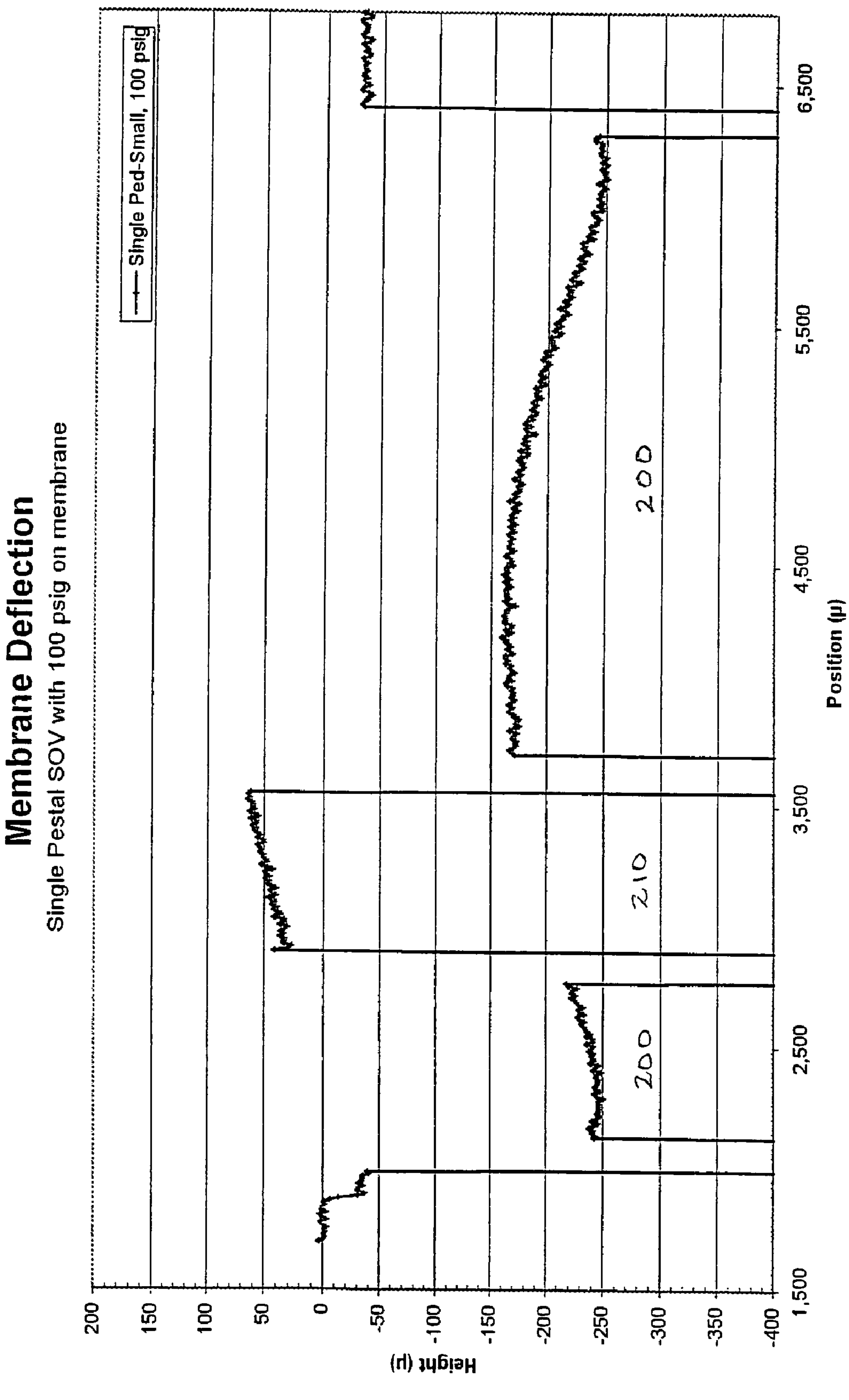
Prior Art FIG. 4
FIG. 4 is a laser profilometer scan of a single pedestal valve actuated with 100 psig air.

An alternative means to achieve a similar result without stiffening the membrane 200 is to form a second pedestal, 245, as shown in FIG. 3B, on cantilever 300. Placing the pedestal on the cantilever simplifies the processing of the membrane while increasing the complexity of the cantilever, a somewhat straightforward task to begin with. Pedestal, 245, hinders the membrane from expanding outward in the region apart from pedestal 210.

It should also be apparent that valves fabricated in accordance with the present invention can be either stand-alone valves, or valves that are coupled to any one of a variety of flow sensing devices known in the art. In addition, it should be apparent that the micro-valves of the present invention can be opened or closed to varying degrees. Thus valves made in accordance with the present invention can not only provide either flow or no-flow of a fluid, but can control the amount of flow of that fluid over a continuous range of flow rates; the valve may be operated in a proportional manner; the degree of openness being proportional to the degree of actuation and energy supplied to the actuation means. Control of fluid flow rate is obtained, for example, by varying the amount of energy converted to mechanical energy by the energy conversion means in portion 100. In this manner, the position of the cantilever element is varied in proportion to the amount of deflection from the de-energized state. Thus, embodiments of the present invention can incorporate an integrated flow or pressure sensing apparatus which can provide dynamic feedback to the valve to control dynamically the flow rate or pressure provided. Where the sensing apparatus is used to sense flow rate, the micro-valve and added elements are commonly referred to as a flow controller. Where the apparatus determines pressure, the micro-valve and added elements are commonly referred to as a pressure controller. For example, a flow controller, in accordance with the present invention, can encompass a flow sensing apparatus having a first pressure sensor, a flow restrictor and a second pressure sensor where the pressure drop across the restrictor is measured. As is known, for a predetermined flow restriction the pressure drop can be accurately calibrated to the flow rate for a specific fluid. Thus the flow sensing apparatus, as described, enables dynamic control of the mass flow rate for the specific fluid selected.

As one of ordinary skill in the art of micro-valves will realize, many variations, in addition to the examples herein, of valves, valve seats, valve elements, cantilevers, sensors, actuation means and restrictors are known. Thus, it would be impractical to describe each configuration. In addition, it will be realized that methods described herein, incorporated by reference from the cited patents as well as other known methods, can be employed to fabricate these configurations of valves and associated elements. Thus, it is understood that these various configurations of valves and elements used in various combinations are intended to be within the scope of the present invention.

The invention claimed is:

1. A micro-valve, comprising:

a fluid guiding structure containing a fluid inlet port and a fluid outlet port;

a fluid communication channel, formed within the fluid guiding structure, fluidically coupling the fluid inlet port to the fluid outlet port;

an intermediary port, formed within the fluid communication channel, the fluid inlet port being fluidically coupled to the fluid outlet port valve through the intermediary port;

a cantilever element, moveably positioned proximate to the intermediary port within the fluid communication channel;

an energy conversion body for actuating the micro-valve defining a chamber enclosing a working fluid and a heater, the energy conversion body being at least partially formed of a semiconductor material, the energy conversion body including a flexible membrane mechanically coupled to the cantilever element through a first pedestal; and a means for stiffening positioned on the flexible membrane between the first pedestal and the fluid inlet port, such that the means for stiffening encounters the cantilever early in the actuation cycle.

2. The micro-valve of claim 1 wherein said cantilever element includes a set of beams operative as a restoring force during deflection of said valve element by said flexible membrane.

3. The micro-valve of claim 1 wherein said flexible membrane is single crystal silicon between 15 and 100 microns thick.

4. The micro-valve of claim 1 wherein said means for stiffening comprises one or more regions of increased thickness of said flexible membrane.

5. A micro-valve, comprising:

a means for actuation comprising a heater attached to a flexible membrane;

a first pedestal;

a cantilever element; and a second pedestal; wherein the flexible membrane is attached to the cantilever element through the first pedestal;

the cantilever element is normally closed over an inlet port;

the inlet port is in fluid communication with at least one outlet port; and the second pedestal is positioned on said flexible membrane between the first pedestal and the fluid inlet port, the second pedestal projecting from the flexible membrane toward the cantilever element, such that the second pedestal encounters the cantilever early in an actuation cycle.

6. The micro-valve of claim 5 wherein said cantilever element includes a set of beams operative as a restoring force during deflection of said valve element by said flexible membrane.

7. The micro-valve of claim 5 wherein said flexible membrane is single crystal silicon between 15 and 100 microns thick.

8. The micro-valve of claim 5 wherein said means for actuation can extend said flexible membrane in a manner proportional to an amount of energy supplied to said means for actuation.

9. The micro-valve of claim 5 wherein said cantilever element contains a compliant element attached onto a portion covering said inlet port.

10. The micro-valve of claim 9 wherein said compliant element comprises at least a portion of PTFE material.

11. A micro-valve, comprising:

means for actuation comprising a heater attached to a flexible membrane, the flexible membrane being attached to a cantilever element through a first pedestal;

said cantilever element being normally closed over an inlet port;

an inlet port in fluid communication with at least one outlet port; and a second pedestal proximate to said first pedestal, wherein said second pedestal is attached to the cantilever element, and projects from the cantilever element toward the flexible membrane, such that the flexible membrane encounters the second pedestal early in an actuation cycle.

* * * * *